(12) United States Patent
Nishimura

(10) Patent No.: US 6,314,800 B1
(45) Date of Patent: Nov. 13, 2001

(54) MICRO-GEOMETRY MEASURING DEVICE

(75) Inventor: Kunitoshi Nishimura, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/461,655

(22) Filed: Dec. 14, 1999

(30) Foreign Application Priority Data

Dec. 15, 1998 (JP) .................................................. 10-356187

(51) Int. Cl.$^7$ .............................. G01B 5/28; G01B 7/34;
G01B 5/20; G01B 7/28
(52) U.S. Cl. ............................... 73/105; 33/551; 33/555;
33/558; 33/558.4; 33/561
(58) Field of Search ........................... 73/105; 33/501.04,
33/503, 504, 533, 551, 555, 556, 558.01,
558.4, 561

(56) References Cited

U.S. PATENT DOCUMENTS

| 2,460,726 | * | 2/1949 | Arndt, Jr. ........................... 73/105 |
| 2,471,009 | * | 5/1949 | Reason .............................. 73/105 |
| 5,146,690 | * | 9/1992 | Breitmeier ....................... 73/105 X |
| 5,309,755 | | 5/1994 | Wheeler ............................ 73/105 |
| 5,922,964 | | 7/1999 | Ishikawa .......................... 73/661 |
| 5,948,972 | * | 9/1999 | Samsavar et al. ................. 73/105 |
| 5,949,257 | | 9/1999 | Ishikawa ......................... 327/72 |

FOREIGN PATENT DOCUMENTS 8-502357    3/1996   (JP) .

* cited by examiner

Primary Examiner—Daniel S. Larkin
(74) Attorney, Agent, or Firm—Webb Ziesenheim Logsdon Orkin & Hanson, P.C.

(57) ABSTRACT

A micro-geometry measuring device capable of reducing measuring force thereof for avoiding damage on micro-geometry of workpiece surface and measuring at a high-speed is provided. The micro-geometry measuring device has a stylus mechanism having a stylus mechanism provided to an arm and having a stylus body, a measuring force adjusting mechanism for adjusting a measuring force working between the stylus body and the workpiece, a displacement sensor for detecting a position of the arm, and a measuring force controller for controlling the measuring force adjusting mechanism. The stylus mechanism includes a vibrator for resonantly vibrating the stylus body, and a detector for detecting vibration status changing when the stylus body touches the workpiece. The change in vibration of the stylus body vibrated by the vibrator is directly detected by the detector and a signal therefrom is fed back to the measuring force controller to keep constant measuring force working between the stylus body and the workpiece.

4 Claims, 5 Drawing Sheets

PRIOR ART

MICRO-GEOMETRY MEASURING DEVICE

BACKGROUND OF THE INVENTION

1. Field of the Invention

The present invention relates to a micro-geometry measuring device for precisely measuring surface geometry of LSI, semiconductor wafers, or the like.

2. Description of Related Art

Special devices are used for precisely measuring surface geometry of semiconductor wafers, etc. Published Japanese translation of PCT international publication for patent applications No. Hei 8-502357 and U.S. Pat. No. 5,309,755 are known as conventional examples of such device.

The conventional example has an arm rotatably supported by a frame through a flexural pivot (elastic hinge), an end of the arm having a stylus made of a diamond tip and the other end of the arm having a movable plate.

The movable vane (plate) moves between two parallel plates fixed to a base, the movable plate forming a bridge-electrode together with the parallel plates to be a pair of capacitor. When the arm pivotally moves, equilibrium of the bridge is lost and displacement of an end of the stylus is measured. Since the movable plate moves between the two parallel plates, the movable plate receives resistance of air and appropriate damping effect can be expected.

A lever arm is provided to a central portion of the arm. A tip provided at an end of the lever arm is controlled by a magnetic field of a biasing mechanism to keep a constant measuring force at a pointed end of a stylus. The control is conducted by feedback of displacement amount of stylus end.

Stabilization of the measuring force will be described below.

Without the feedback control by the biasing mechanism, since the arm is rotatably supported by the elastic hinge, the measuring force fluctuates in accordance with rotation angle of the arm as shown in solid line p in a graph of FIG. 7. In other words, the measuring force differs according to a position of the stylus or a magnitude of irregularity of a workpiece, which causes error in detection result of surface position of the workpiece, and, when angle fluctuation is large, the measuring force can be so excessive as to effect bad influence on the surface of the workpiece.

Accordingly, the biasing mechanism is provided to the lever arm and magnetic force is applied therefrom, thereby conducting correction corresponding to measuring force fluctuating in accordance with the angle. If the correction results in a characteristic shown in dotted line Q in the graph of FIG. 7, the measuring force can be largely reduced from f1 to f2 at the arm rotation angle shown by D in the graph.

Incidentally, for correcting measuring force by the biasing mechanism of the above-described conventional example, the displacement amount of the stylus end is detected, which is fed back to magnetic intensity at the distal end of the lever arm.

However, in the conventional example, the measuring force working onto the stylus and the workpiece is not directly detected for control, but the position of the movable plate is detected for indirect control based on the position value. On account of the indirect control, the measuring force cannot be controlled (stabilized) precisely enough for the stylus to accurately follow the irregularity on the surface of the workpiece.

On the other hand, the measuring force itself may be increased for the stylus to accurately follow the surface of the workpiece. However, micro-geometry on the workpiece surface is likely to be damaged by the stylus in the above arrangement.

Further, since the measuring force is controlled by the distal end of the lever arm, mechanical rigidity between the stylus and the distal end of the lever arm is small in the conventional example, so that responsivity thereof cannot be improved.

Accordingly, the measuring force working between the stylus and the workpiece is fifty microgram-force ($\mu$gf) at the minimum, and measurement is difficult at a lower measuring force or with a faster arm movement.

SUMMARY OF THE INVENTION

An object of the present invention is to provide a micro-geometry measuring device capable of reducing measuring force for avoiding damage on the micro-geometry of the workpiece surface and measuring at a high speed.

For attaining the above object, a vibrating stylus is used for a stylus mechanism having a stylus body, in which measuring force working between the vibrating stylus and the workpiece is directly measured.

More specifically, a micro-geometry measuring device according to the present invention includes: a pivotable arm; a stylus mechanism having a stylus body provided to the arm to be in contact with a workpiece; a measuring force adjusting mechanism for adjusting a measuring force working between the stylus body and the workpiece; a displacement sensor for detecting a position of the arm; and a measuring force controller for controlling the measuring force adjusting mechanism, the stylus mechanism including a holder provided to a part of the arm, the stylus body attached to the holder, a vibrator for resonantly vibrating the stylus body, and a detector for detecting vibration status to be changed when the stylus body touches the workpiece, and the measuring force controller conducting feedback control of the measuring force adjusting mechanism based on an output signal sent from the detector.

According to the present invention, the stylus body of the stylus mechanism abuts to the workpiece surface and the measurement is conducted while relatively moving along the surface.

When the stylus body relatively moves while following irregularity of the workpiece surface, the arm having the stylus body is pivotally moved. The position of the arm is detected by the displacement sensor and the displacement when the stylus body touches the workpiece, i.e. the surface position of the workpiece is measured.

The measuring force of the stylus body against the workpiece is adjusted by the measuring force adjusting mechanism. The measuring force adjusting mechanism is controlled by the measuring force controller for the stylus body to abut to the workpiece always at an appropriate measuring force.

In other words, when the vibrator of the stylus mechanism is driven, the stylus body resonantly vibrates at a predetermined vibration mode. When the stylus body abuts to the workpiece surface in the above condition, the vibration of the stylus body is restricted and the vibration change is detected by the detector.

Then, output signal from the detector is sent to the measuring force controller and a signal is sent to the measuring force adjusting mechanism for feedback control of the measuring force.

Since the stylus mechanism of the present invention is a vibrating stylus including the stylus body, the vibrator and the detector, the measuring force working between the stylus body and the workpiece can be directly detected. In other words, the stylus body is vibrated for contact detection by virtue of restriction of the vibration caused by the contact against to the workpiece, and the measuring force against the workpiece can be detected by the restriction of the vibration.

When the measuring force adjusting mechanism conducts feedback control based on the directly detected signal through the measuring force controller, measuring force fluctuation caused by the irregular surface of the workpiece can be set extremely low, thereby conducting accurate and high-speed measurement.

In the present invention, the stylus body of the stylus mechanism may be resonantly vibrated in an axial direction thereof, or alternatively, the stylus body may be flexurally vibrated (vibrating crosswise relative to the axis). However, the stylus body is preferably vibrated in the axial direction thereof.

Generally speaking, since the flexural natural frequency is lower than a natural frequency in the axial direction, the axially vibrating type of the stylus body has higher responsivity than the flexurally vibrating type, thereby accurately detecting the measuring force.

In the present invention, the stylus mechanism may preferably oppose the measuring force adjusting mechanism and the displacement sensor sandwiching the arm.

According to the above arrangement, since the stylus mechanism, the measuring force adjusting mechanism, and the displacement sensor are approximately linearly disposed, measurement error (Abbe's error) can be minimized irrespective of arm length.

DETAILED DESCRIPTION OF PREFERRED EMBODIMENT(S)

Figure 1:
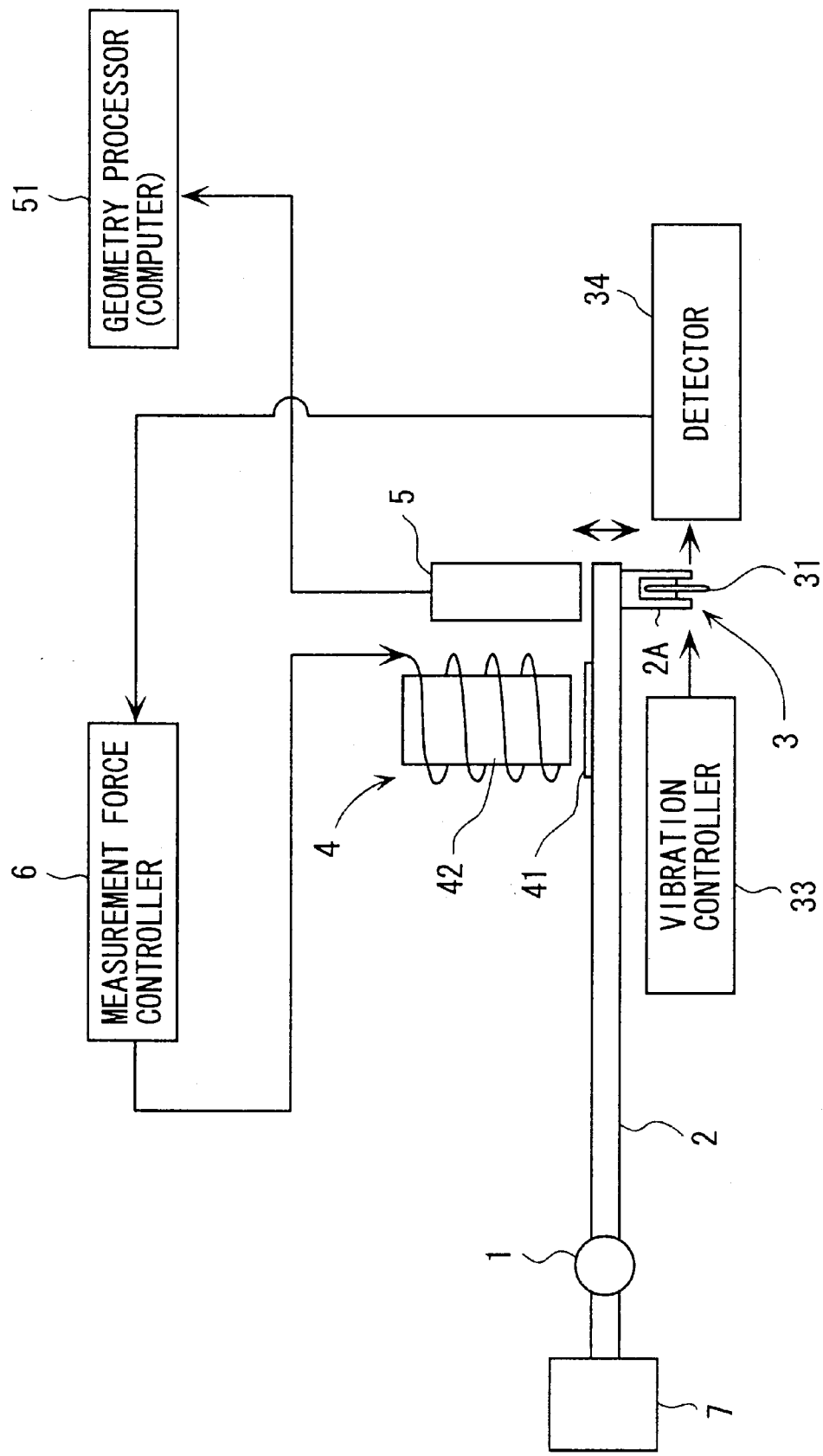
FIG. 1 is a summarized block diagram showing a micro-geometry measuring device according to first embodiment of the present invention.

Preferred embodiments of the present invention will be described below in detail with reference to attached drawings.

The present invention is a micro-geometry measuring device for precisely measuring surface geometry of LSI, semiconductor wafers, or the like. In the following, the same components of respective embodiments will be applied with the same reference numerals to omit or simplify the description thereof.

FIG. 1 to FIG. 4 show a first embodiment of the present invention.

FIG. 1 is a summarized block diagram of a micro-geometry measuring device according to the first embodiment. In FIG. 1, the micro-geometry measuring device has an arm 2 pivotably provided to a frame (not shown) through a bearing 1, a stylus mechanism 3 provided to a lower surface of an end of the arm 2 through an attachment portion 2A of the arm 2 and having a stylus 31 to be in contact with a workpiece (not shown), a measuring force adjusting mechanism 4 for adjusting a measuring force working between the stylus 31 and the workpiece, a displacement sensor 5 for detecting a position of the arm 2, and a measuring force controller 6 for controlling the measuring force adjusting mechanism 4.

A balance weight 7 for balancing the weight of the stylus mechanism 3 around the bearing 1 is provided on the other end of the arm 2.

Figure 2:
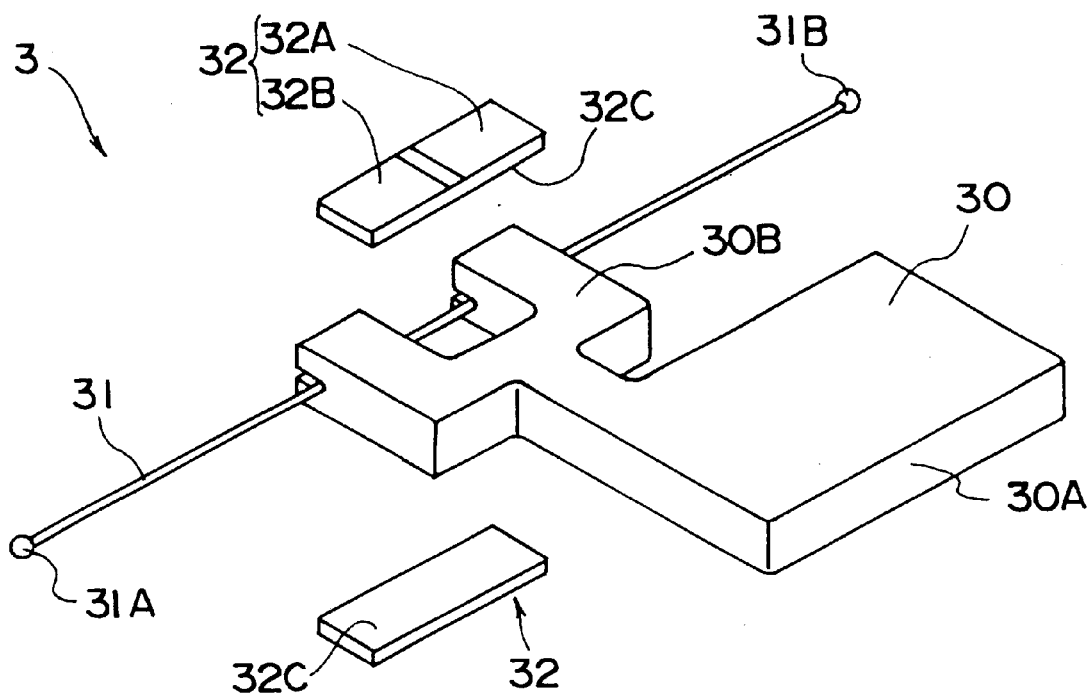
FIG. 2 is an exploded perspective view showing stylus mechanism of the first embodiment.
Figure 3:
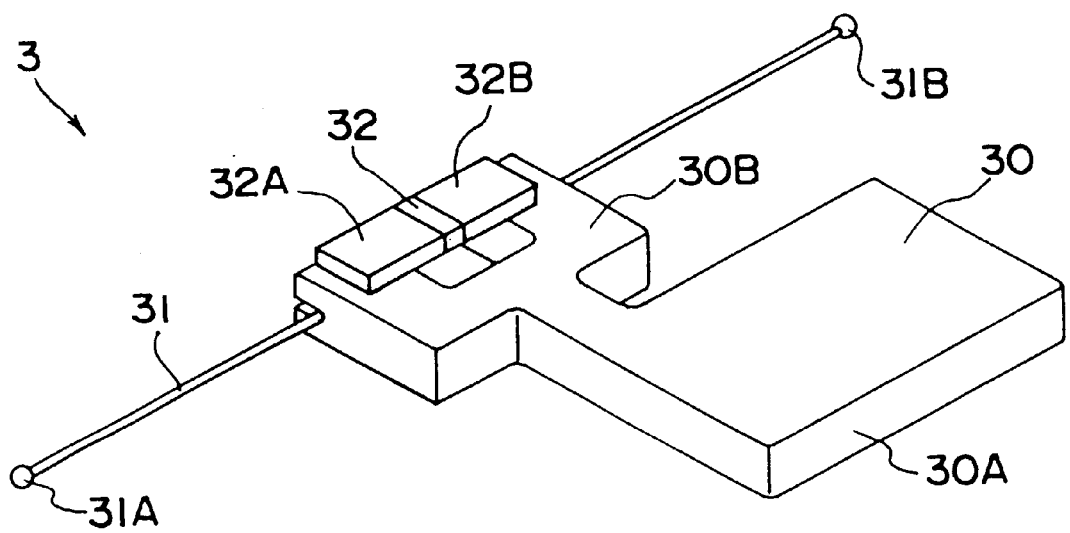
FIG. 3 is a perspective view showing a stylus mechanism of the first embodiment.

Detailed arrangement of the stylus mechanism 3 is shown in FIG. 2 and FIG. 3.

In the figures, the stylus mechanism 3 includes a holder 30 made of a metal material provided to the attachment portion 2A (see FIG. 1) of the arm 2 and, the stylus 31 being mounted to the holder 30 constructing a stylus body, and two piezoelectric elements 32 provided to the holder 30.

The holder 30 has an approximately flat-plate fixed portion 30A to be attached to the attachment portion 2A of the arm 2, and an attachment portion 30B connected to the fixed portion 30A for attaching the stylus 31. The attachment portion 30B is branched in two-ways, the two-way branch supporting two positions of the stylus 31. The branches of the attachment portion 30B are shaped in an identical configuration. The attachment portion 30B and the fixed portion 30A are largely narrowed for equalizing mechanical impedance at the two holding points of the stylus 31.

The stylus 31 has a contact portion 31A provided at an end of a narrow stick member to be in contact with the workpiece, and a counter balancer 31B at the other end of the stick member having the same weight as the contact portion 31A.

Figure 4:
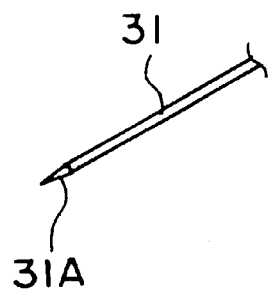
FIG. 4 is an enlarged perspective view showing an example of end configuration of a stylus as a stylus body of the stylus mechanism.

As shown in FIG. 2 and FIG. 3, though the contact portion 31A may have a ball-shape, specific configuration is not limited. When a extremely microscopic configuration is measured, since a curvature radius of the contact portion 31A has to be reduced, the contact portion 31A is made into a stylus tip or a needle stylus having sharp pointed end as shown in FIG. 4. Though the counter balancer 31B may have a ball-shape as shown in FIGS. 2 and 3, a cube-shaped body or the like may also be used.

The two piezoelectric elements 32 span over the branched portion of the attachment portion 30B to be opposed with each other, which are fixed by adhesion, soldering, and the like.

The respective piezoelectric elements 32 have a vibrating electrode 32A for resonantly vibrating the stylus 31, a detecting electrode 32B as a detecting means for detecting vibration status of the stylus 31 to be changed in accordance with contact with the workpiece, and a common electrode 32C.

The vibrating electrode 32A and the detecting electrode 32B are formed on an outer side of the piezoelectric element 32 and the common electrode 32C is formed on mutually opposing inner sides of the two piezoelectric elements 32. When a drive voltage with an appropriate frequency is applied to the vibrating electrode 32A by a vibration controller 33 (see FIG. 1), the stylus 31 is vibrated with a node of vibration at a center of two portions held in axial direction thereof and with antinode of vibration at the contact portion 31A and the counter balancer 31B. When the workpiece touches the contact portion 31A, the resonance status is changed, which is detected by the detecting electrode 32B, and a signal therefrom is sent to the measuring force controller 6 through a detecting circuit 34 (see FIG. 1).

As shown in FIG. 1, the stylus mechanism 3 opposes the measuring force adjusting mechanism 4 and the displacement sensor 5 with the arm 2 therebetween. In other words, the displacement sensor 5 is disposed right above the stylus mechanism 3, and the measuring force adjusting mechanism 4 is disposed adjacent to the displacement sensor 5.

The measuring force adjusting mechanism 4 has a magnetic material 41 fixed on an upper side of the arm 2, and an electromagnet 42 disposed right above the magnetic material 41. When electricity is applied to the electromagnet 42, a repellent force or an attraction force is generated relative to the magnetic material 41 to apply a predetermined measuring force between the stylus 31 of the stylus mechanism 3 and the workpiece. The measuring force is adjusted by controlling the electric current applied to the electromagnet 42.

The displacement sensor 5 detects the displacement of the stylus 31 to display the detected result by a geometry processor (computer) 51 and specific arrangement thereof is not limited. For instance, an ultrasonic wave or beam of light may be irradiated onto the upper surface of the arm 2 from the displacement sensor 5 and the displacement of the stylus 31 may be detected by the ultrasonic wave or the beam of light reflected by the upper surface.

The measuring force controller 6 controls the electric current supplied to the electromagnet 42 of the measuring force adjusting mechanism 4 in receiving the detection signal sent from the detecting circuit 34. The detecting circuit 34 outputs a resonance status change detected by the detecting electrode 32B to the measuring force controller 6 as a signal corresponding to an amplitude shift. The measuring force controller 6 calculates a difference between a predetermined signal value corresponding to measuring force and an output signal from the detecting circuit 34, which is sent to the measuring force adjusting mechanism 4 together with an operated differential value and integral value as necessary. Accordingly, when the measuring force actually applied to the stylus 31 is larger than the predetermined value, the measuring force controller 6 controls the measuring force adjusting mechanism 4 to separate the stylus 31 from the workpiece. When the measuring force actually applied to the stylus 31 is smaller than the predetermined value, the measuring force adjusting mechanism 4 is controlled to press the stylus 31 to the workpiece.

According to the thus arranged micro-geometry measuring device of the first embodiment, the stylus 31 of the stylus mechanism 3 is abutted to the surface of the workpiece and is relatively moved along the surface during measurement.

At this time, the stylus 31 relatively moves following the irregularity on the workpiece surface, so that the arm 2 having the stylus 31 is pivotably moved around the bearing 1 as a pivot center. The displacement of the predetermined position of the arm 2 is detected by the displacement sensor 5 as a displacement of the stylus 31.

The measuring force of the stylus 31 provided to the arm 2 is detected by the detecting electrode 32B and the detected signal is sent to the measuring force controller 6 through the detecting circuit 34. The measuring force controller 6 keeps the measuring force between the stylus 31 and the workpiece at a predetermined value by a feedback control of the measuring force adjusting mechanism 4.

According to the above-described embodiment, the following effects can be obtained.

1) Since the micro-geometry measuring device has the pivotable arm 2, a stylus mechanism provided to the arm 2, and has the stylus 31 in contact with the workpiece, the measuring force adjusting mechanism 4 for adjusting the measuring force applied between the stylus 31 and the workpiece, the displacement sensor 5 for detecting the position of the arm 2, and the measuring force controller 6 for controlling the measuring force adjusting mechanism 4, the surface irregularity of the workpiece can be measured by moving the device along the surface of the workpiece.

2) Since the stylus mechanism 3 has the holder 30 disposed to a part of the arm 2, the stylus 31 attached to the holder 30, the vibrating electrode 32A for resonantly vibrating the stylus 31, and the detecting electrode 32B for detecting vibration status to be changed when the stylus 31 touches the workpiece, the change in vibration of the stylus 31 vibrated by the vibrating electrode 32A can be directly detected by the detecting electrode 32B, so that the measuring force working between the stylus 31 and the workpiece can be directly detected. Accordingly, even when the measuring force is reduced (specifically, below 50 $\mu$gf), the stylus 31 can precisely follow the workpiece surface, thereby conducting highly accurate high-speed measurement.

3) Since the measuring force controller 6 conducts feedback control of the measuring force adjusting mechanism 4 based on the output signal sent from the detecting electrode 32B, fluctuation in measuring force on account of irregularity of the workpiece surface can be reduced extremely low, thereby conducting accurate measurement.

4) Since the stylus 31 of the stylus mechanism 3 resonantly vibrates in the axial direction thereof and natural frequency in the axial direction is higher than the natural frequency of flexure, responsivity thereof can be improved for conducting accurate detection of measuring force.

5) Since the stylus mechanism 3 opposes the measuring force adjusting mechanism 4 and the displacement sensor 5 sandwiching the arm 2, the stylus mechanism 3, the measuring force adjusting mechanism 4, and the displacement sensor 5 are approximately linearly disposed, so that measurement error (Abbe's error) can be reduced irrespective of the length of the arm 2.

6) Since the displacement sensor 5 is disposed right above the stylus mechanism 3, the displacement of the stylus 31 can be detected without error.

7) Since the stylus mechanism 3 is disposed on an end of the arm 2 and the balance weight 7 is disposed on the other end sandwiching the bearing 1, the arm 2 can be easily balanced even when the distance of the arm 2 from the bearing 1 to the stylus 31 is lengthened. Accordingly, the length from the bearing 1 to the stylus 31 can be increased, so that the displacement of the stylus 31 in accordance with pivot movement of the arm 2 can be approximated to a linear movement, thereby measuring accurate displacement.

Next, a second embodiment of the present invention will be described below with reference to FIG. 5. The second embodiment differs from the first embodiment in the arrangement of the stylus mechanism 3 and the rest of the arrangement is the same as the first embodiment.

Figure 5:
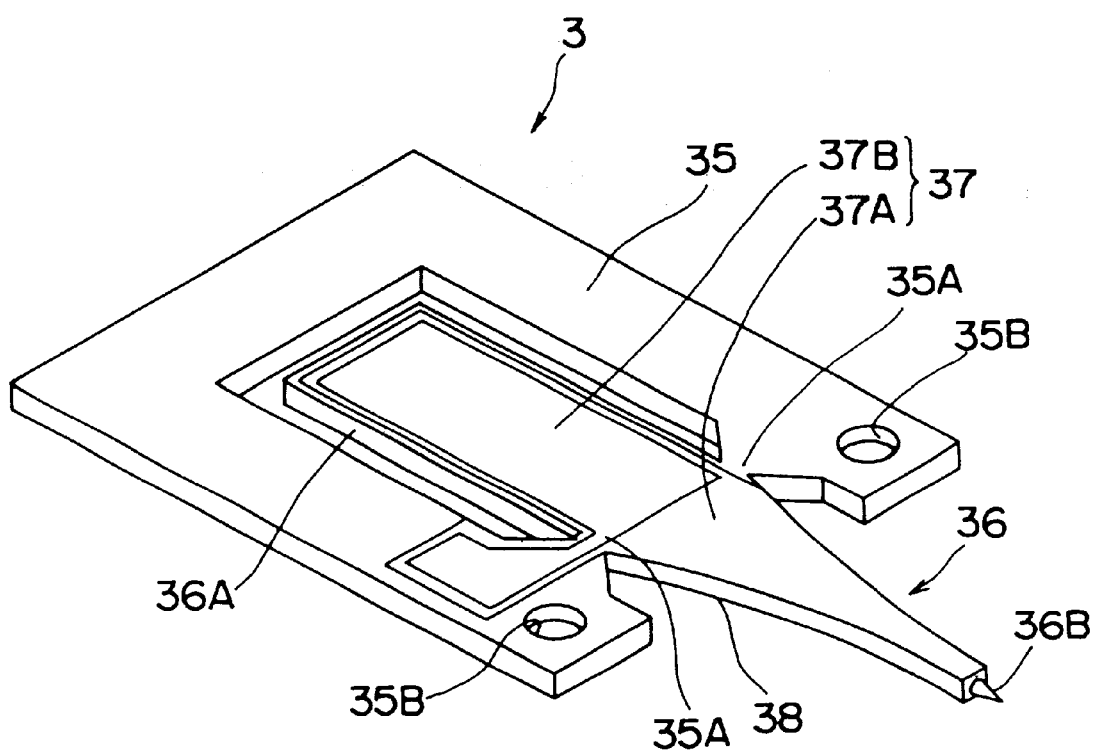
FIG. 5 is a perspective view showing a stylus mechanism according to a second embodiment of the present invention.

In FIG. 5, the stylus mechanism 3 has a stylus holder 35 provided to the attachment portion 2A of the arm 2 (see FIG. 1), a stylus body 36 having a vibrator 36A supported by the stylus holder 35 and a contact portion 36B provided at an end of the vibrator 36A to be in contact with the workpiece, a vibrating means 37 for resonantly vibrating the stylus body 36 in an uniaxial direction, and a detecting means 38 for detecting a vibration change generated when the contact portion 36B touches the workpiece. The vibrating means 37 is connected to the vibration controller 33 (see FIG. 1) and the detecting means 38 is connected to the detecting circuit 34 (see FIG. 1).

The stylus holder 35 and the vibrator 36A are integrally formed from a thin plate-shaped member made of titanium. The stylus holder 35 is a flat plate formed in a flat C-shape. The vibrator 36A has a vibrating direction in longitudinal direction thereof and is made into a narrow flat plate having a central portion to be a node of vibration supported by an opening end of the stylus holder 35 through a holding point 35A. The plates are coplanarly disposed. The stylus holder 35 and the stylus body 36 have an approximately symmetrical arrangement along the face direction of the plate-shaped member.

Two mount holes 35B are formed on the opening end of the stylus holder 35.

The vibrator 36A has a flat rectangular base end disposed at the opening of the stylus holder 35 and has a pointed end projecting from the opening of the stylus holder 35 to be a horned-shape gradually narrowing from the holding point 35A to the contact portion 36B. The horned-shape may be curved as shown in FIG. 5 or may be linear.

The contact portion 36B is a needle member provided at a pointed end surface of the vibrator 36A extending in an axial direction of vibration, more specifically, a conic micro-needle with an gradually narrowing diameter toward an end thereof. The micro-needle is made of a diamond tip and the like.

The vibrating means 37 has a piezoelectric material layer 37A made of PZT thin layer provided on entire surface of the vibrator 36A and on a part of a surface of the stylus holder 35, and an electrical conductive material layer 37B provided on a base end side of the vibrator 36A and the stylus holder 35 side of an upper side of the piezoelectric material layer 37A.

The electrical conductive material layer 37B of the oscillator 37 is made of gold or the like and works as a vibrating electrode, which is distorted by applying electrical voltage between the conductive material layer 37B and the vibrator 36A to work electrical field to the piezoelectric material layer 37A.

The detecting means 38 has the same arrangement except for being provided at a backside of the vibrator 36A and the stylus holder 35.

The conductive material layer of the detecting means 38 works as a detecting electrode, which detects an electrical voltage change caused to the piezoelectric material layer provided between the conductive material layer and the vibrator 36A.

According to the second embodiment, the following effects can be obtained as well as effects 1) to 7) of the first embodiment.

8) Since the stylus holder 35 and the stylus body 36 are integrally constructed of a plate-shaped body, energy loss at the holding point 35A can be minimized, thereby improving detection accuracy.

9) Since the vibrator 36A has a horned shape gradually narrowing from the point held by the stylus holder 35 toward a pointed end provided with the contact portion 36B, large amplitudes can be obtained at the end portion of the stylus body 36, thereby improving detection accuracy.

10) Since the plate-shaped body structuring the stylus holder 35 and the vibrator 36A is made of titanium, superior corrosion resistance can be obtained.

Incidentally, the scope of the present invention is not restricted to the above-described embodiments, but includes following modifications as long as an object of the present invention can be achieved.

Figure 6:
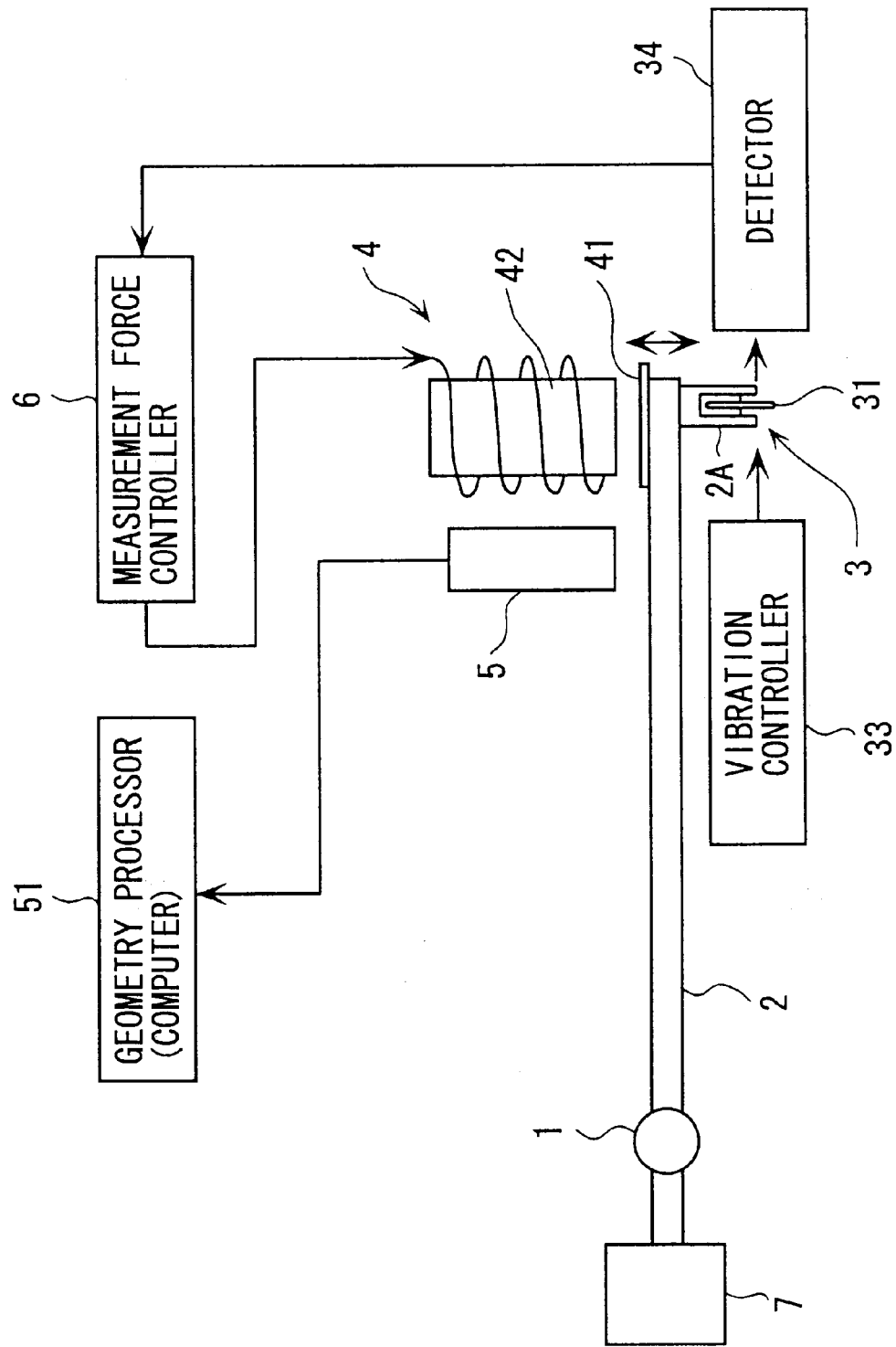
FIG. 6 is a summarized block diagram showing a modification of the present invention.
Figure 7:
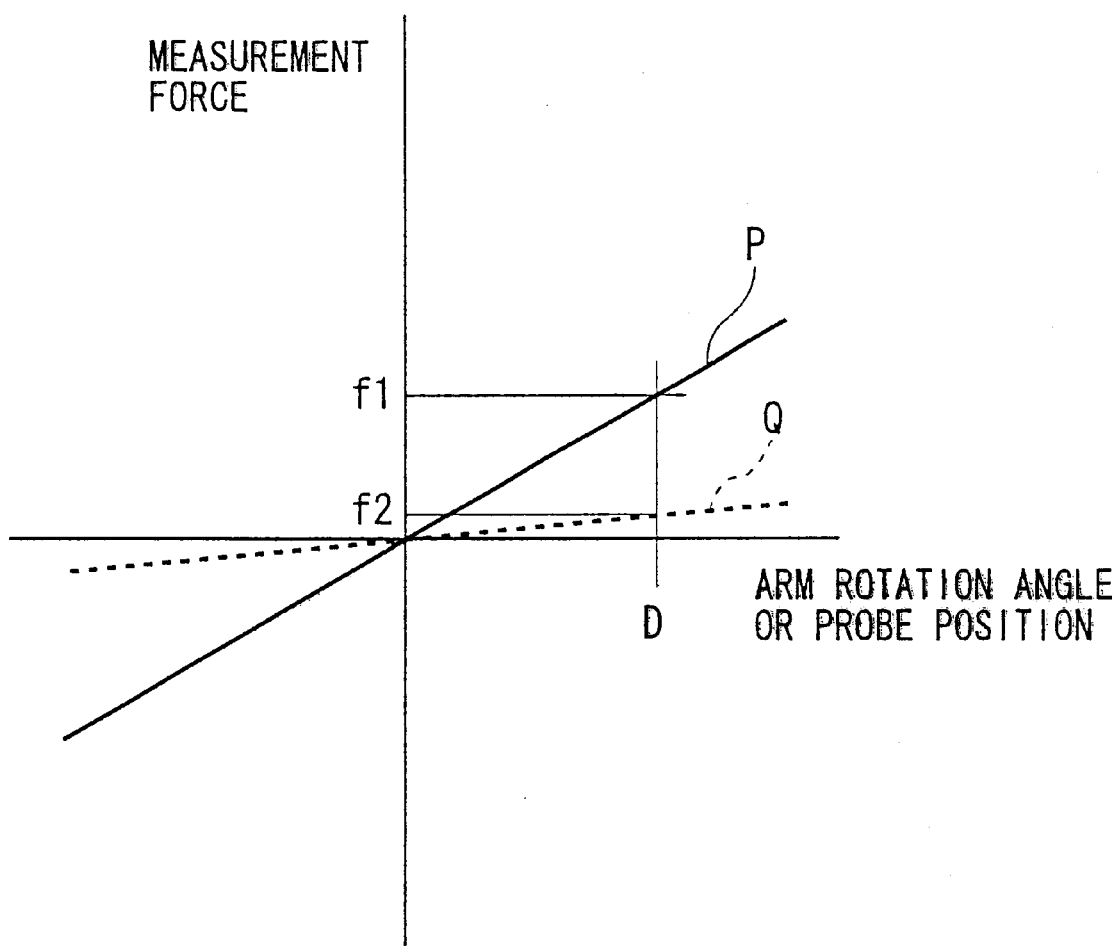
FIG. 7 is a graph showing problem of conventional art.

For instance, though the displacement sensor 5 is disposed right above the stylus mechanism 3 in the above embodiments, the measuring force adjusting mechanism 4 may be disposed right above the stylus mechanism 3 as shown in FIG. 6 and the displacement sensor 5 may be disposed adjacent to the measuring force adjusting mechanism 4. Or, alternatively, the measuring force adjusting mechanism 4 and the displacement sensor 5 may be disposed so that a central position thereof comes right above the stylus mechanism 3. In short, the measuring force adjusting mechanism 4 and the displacement sensor 5 can be disposed in any manner as long as being adjacent to the stylus mechanism 3. However, according to the arrangement shown in FIG. 6, since the force from the measuring force adjusting mechanism 4 is directly applied from right above the stylus mechanism 3, mechanical rigidity can be enhanced as compared to disposition of the stylus mechanism 3 and the measuring force adjusting mechanism 4 being offset in longitudinal direction of the arm 2 as shown in FIG. 1.

Further, the balance weight 7 is not required to be disposed at an end of the arm 2. When the balance weight 7 is not provided, an end portion of the arm 2 may be lengthened to balance the weight.

Further, according to the above-described embodiments, the measuring force adjusting mechanism 4 is a movable steel-piece actuator having the magnetic material 41 fixed to the arm 2 and the electromagnet 42 disposed on the magnetic material 41. However, the measuring force adjusting mechanism 4 may be an actuator of moving coil in which force is applied to a permanent magnet by magnetic flux, or may be an actuator for applying force by a static electricity.

Though the stylus mechanism 3 resonantly vibrates the stylus body 31 and 36 in the axial direction thereof, the stylus body 31 and 36 of the present invention may flexurally vibrate.

The vibrator 36A and the stylus holder 35 of the second embodiment may not be formed of titanium, but other metal material may be used.

Further, the pointed end of the vibrator 36A may not have a horned shape, which may be, for instance, flat rectangular shape.

What is claimed is:

1. A micro-geometry measuring device for measuring a workpiece comprising:
   a pivotable arm;
   a stylus mechanism having a stylus body connected to the arm to be in contact with the workpiece;
   a measuring force adjusting mechanism for adjusting a measuring force working between the stylus body and the workpiece;
   a displacement sensor for sensing a position of the arm; and
   a measuring force controller for controlling the measuring force adjusting mechanism,
   the stylus mechanism including a holder connected to a part of the arm, the stylus body attached to the holder, a vibrator for resonantly vibrating the stylus body, and a detector for detecting a vibration status to be changed when the stylus body touches the workpiece, the measuring force controller conducting feedback control of the measuring force adjusting mechanism based on an output signal sent from the detector.

2. The micro-geometry measuring device according to claim 1, wherein the stylus body of the stylus mechanism resonantly vibrates in an axial direction thereof.

3. The micro-geometry measuring device according to claim 2, wherein the stylus mechanism opposes the measuring force adjusting mechanism and the displacement sensor sandwiching the arm.

4. The micro-geometry measuring device according to claim 1, wherein the stylus mechanism opposes the measuring force adjusting mechanism and the displacement sensor sandwiching the arm.

* * * * *